(12) United States Patent
Hoberock et al.

(10) Patent No.: US 6,184,914 B1
(45) Date of Patent: Feb. 6, 2001

(54) ELECTROPHOTOGRAPHIC PRINTING SYSTEM AND METHOD, USING TONERS THAT EXHIBIT DIFFERENT CHARGE STATES

(75) Inventors: Tim M. Hoberock; William E. Britton; Gary L. Holland, all of Boise, ID (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/370,356

(22) Filed: Aug. 9, 1999

(51) Int. Cl.[7] .................................................. B41J 2/47
(52) U.S. Cl. ...................... 347/240; 347/228; 347/251; 347/140; 399/222; 399/231
(58) Field of Search ..................... 347/228, 240, 347/251, 140, 131; 399/152, 153, 222, 223, 231

(56) References Cited

U.S. PATENT DOCUMENTS

| | | | |
|---|---|---|---|
| 5,347,345 | * | 9/1994 | Osterhoudt ........................... 399/231 |
| 5,361,089 | | 11/1994 | Bearss et al. ........................ 347/119 |
| 5,450,189 | | 9/1995 | Russell et al. ........................ 399/55 |

* cited by examiner

*Primary Examiner*—N. Le
*Assistant Examiner*—Hai C. Pham

(57) ABSTRACT

An electrophotographic imaging system produces multiple gray level images and includes a photoconductor and a charger for repetitively charging the photoconductor to a first charge potential. A laser system selectively discharges the photoconductor in accord with applied image data. A first toner is utilized and exhibits a first charge state that is attracted by a first discharge voltage of the photoconductor. A second toner is also used that exhibits a second charge state of the same sense as the first toner, but is attracted by a second discharge voltage of larger magnitude than the first discharge voltage. A processor modulates the laser system to cause the photoconductor to be discharged to the first discharge voltage when only the first toner is to be attracted to the photoconductor. The processor further modulates the laser scanner to cause the photoconductor surface to be discharged to the second discharge voltage. This action enables areas discharged to the first discharge voltage to be toned by the first toner, and areas discharged to the second discharge voltage to be toned by both the first and second toners so as to create a more dense toner surface.

10 Claims, 2 Drawing Sheets

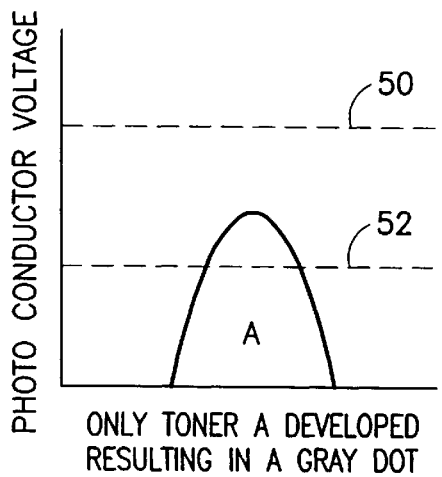
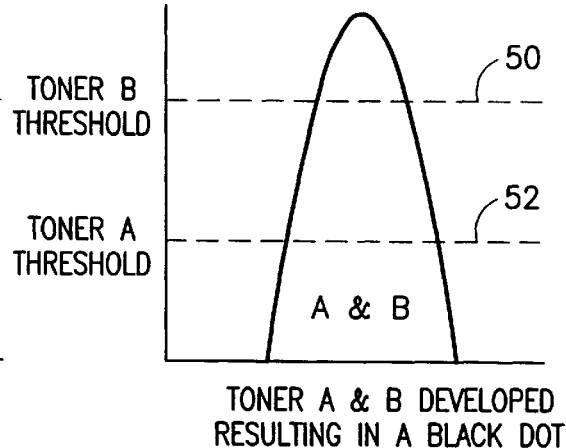
FIG.2A  
FIG.2B
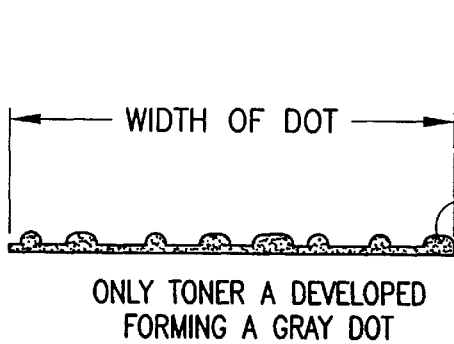
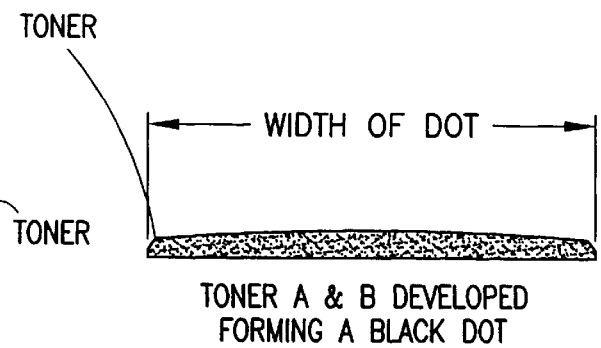
FIG.3A  
FIG.3B
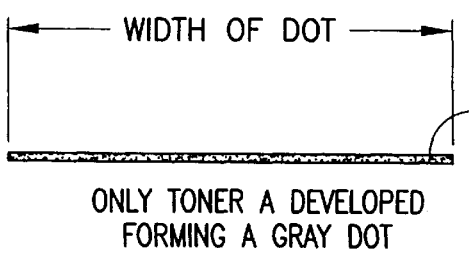
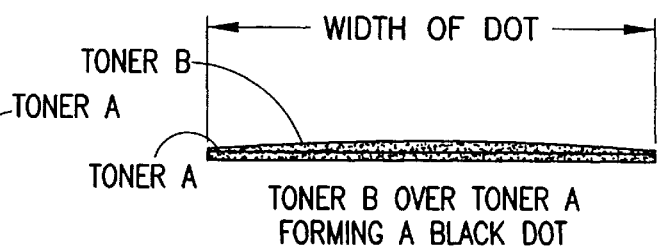
FIG.4A  
FIG.4B

ELECTROPHOTOGRAPHIC PRINTING SYSTEM AND METHOD, USING TONERS THAT EXHIBIT DIFFERENT CHARGE STATES

FIELD OF THE INVENTION

This invention relates generally to electrophotographic printing systems and, more particularly, to an electrophotographic printing system and method which employs toners that exhibit charge states of the same sense, but of different charge levels.

BACKGROUND OF THE INVENTION

Electrophotographic imaging systems employ a photoconductor surface that is first charged to a uniform voltage and is then discharged in accordance with an image to be reproduced. A scanned laser beam accomplishes the discharge action. The photoconductor thereby gains an electrostatic latent image that constitutes a matrix of discharged pixel sites. In a black/white printer, the photoconductor surface is generally developed using a black toner that adheres to the discharged pixel sites to form the image. Thereafter, the toned photoconductor is carried to a transfer station where the image is transferred to a media sheet.

In multicolor printers, successive images are developed, employing different color toners that are supplied from corresponding toner modules. The color printing is normally accomplished through use of yellow, cyan and magenta toners that are applied, in registration, either during successive rotations of the photoconductor surface, or during a single rotation of the photoconductor surface.

The toning process is based on electrostatic attraction of charged toner particles to areas of opposite sign charge voltage on the photoconductor. The charge voltage on the photoconductor may be either positive or negative relative to the toner particles. Many electrophotographic printers employ discharge area development wherein the toner is attracted to, and tones, the areas that have been discharged by the scanned laser. Alternatively, a toner may be used which has an opposite sign charge to the photoconductor and results in charge area development. In such a process, the laser discharges the areas that are not intended to receive the toner. The toner, which is of the opposite sign compared to the charged image areas, is electrostatically repelled by the discharge areas and is attracted to the opposite sign charged areas.

In the prior art, imaging systems have employed toners that exhibit multiple charge states to accomplish a multicolor print action. U.S. Pat. No. 5,450,189 to Russell et al., assigned to the same Assignee as this application, discloses an electrostatic imaging system wherein the photoconductor is charged to a first charge potential. Areas of the photoconductor are then discharged to a second charge potential in accordance with applied image signals. A first toner that exhibits a charge state that is attracted by the second (discharge) charge potential, but is repelled by the first charge potential, is utilized to tone the discharged regions on the photoconductor. A second toner is also utilized that exhibits an opposite charge state to the first toner's charge state. Thus, the second toner is attracted by the first charge potential and is repelled by the second charge potential.

A controller enables the first toner to be applied to the imaged photoconductor, with the entire photoconductor thereafter being recharged. Then, non-imaged areas of the photoconductor are discharged to a charge potential that repels the second toner. The second toner is then applied to imaged areas that remain at the first charge potential.

The Russell et al. system requires two charging actions to accomplish the deposition of the plural toners, and further requires toners exhibiting different sense charge states.

Electrophotographic printers that provide multiple gray levels employ halftone arrangements of printed dots to form the gray regions. Such halftoning generally employs single, solid dots to form each pixel. The more levels of gray that are required of the printer, the greater the number of dots needed, per pixel, to accomplish the gray levels.

Current personal and business laser printers exhibit dot resolutions of 1200 dots per inch (dpi). A 1200 dpi laser printer forms 75 pixels per inch, each pixel comprising an 8-bit gray value. Use of a single color black toner to provide multiple gray levels requires, potentially, a substantial number of dots per pixel. There is a need to provide such printers with an ability to produce multiple gray levels using a smaller number of dots to form the required gray levels. Such a smaller number of dots enables higher print speeds to be attained, while retaining the desired high quality print output demanded by consumers.

Accordingly, it is an object of this invention to provide an improved electrophotographic method and system for producing multiple gray level print outputs.

It is another object of this invention to provide an improved electrophotographic print method and system that employs toners exhibiting a single charge sense.

It is yet another object of the invention to provide an improved electrophotographic printer wherein multiple gray levels are provided during a single cycle of operation of the photoconductor surface.

SUMMARY OF THE INVENTION

An electrophotographic imaging system produces multiple gray level images and includes a photoconductor and a charger for repetitively charging the photoconductor to a first charge potential. A laser system selectively discharges the photoconductor in accord with applied image data. A first toner is utilized and exhibits a first charge state that is attracted by a first discharge voltage of the photoconductor. A second toner is also used that exhibits a second charge state of the same sense as the first toner but is attracted by a second discharge voltage of larger magnitude than the first discharge voltage. A processor modulates the laser system to cause the photoconductor to be discharged to the first discharge voltage when only the first toner is to be attracted to the photoconductor. The processor further modulates the laser scanner to cause the photoconductor surface to be discharged to the second discharge voltage. This action enables areas discharged to the first discharge voltage to be toned by the first toner, and areas discharged to the second discharge voltage to be toned by both the first and second toners so as to create a more dense toner surface.

BRIEF DESCRIPTION OF THE DRAWINGS

FIG. 2a is a plot of laser output energy and illustrates a first, or "low" laser output energy level that is utilized to develop only the first toner.

FIG. 2b is a plot of laser output energy for a high laser output energy that is utilized to enable development of both the first and second toners that are employed in the electrophotographic imaging system.

FIG. 3a illustrates a deposited dot pattern that is utilized to form a gray dot, in a first printing method employed by the invention.

FIG. 3b illustrates the use of the first and second toners to develop a darker dot in the first printing method employed by the invention.

FIG. 4a illustrates the configuration of a gray dot that is produced using a second printing method of the invention.

FIG. 4b illustrates overlaid layers of the first and second toners that are used to achieve darker dots, during the performance of the second printing method of the invention.

DETAILED DESCRIPTION OF THE INVENTION

Figure 1:
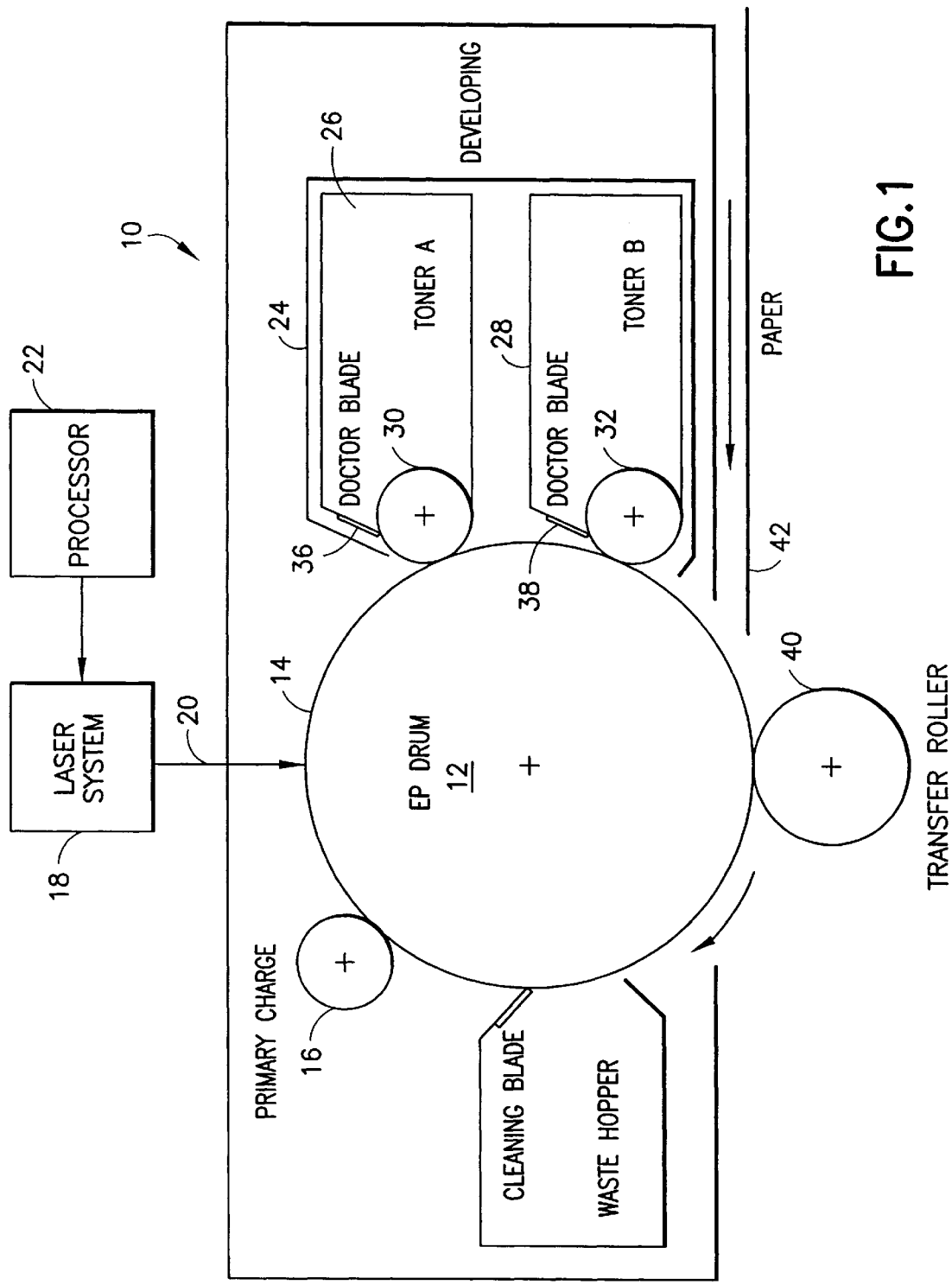
FIG. 1 is a schematic illustration of an electrophotographic imaging system employing the invention.

Referring to FIG. 1, an exemplary electrophotographic cartridge 10 is illustrated that includes a drum 12 having a photoconductor surface 14. A primary charge roller 16 applies a high charge voltage to photoconductor 14. Hereafter, it will be assumed that primary charge roller 16 applies a high negative bias to photoconductor 14.

In the known manner, laser system 18 scans a beam 20 across the surface of photoconductor 14 so as to selectively discharge pixel sites that are to be thereafter toned. A processor 22 is coupled to laser system 18 and provides control signals which both image-wise modulate laser system 18 in accordance with applied image signals and also vary the energy output of laser system 18 in accordance with desired pixel gray levels. More particularly, processor 22 applies control signals to laser system 18 which cause beam 20 to exhibit at least two different output energy levels, a first "low" output energy level and a second "high" output energy level.

The low output energy level beam causes a partial discharge of photoconductor 14, while the high output energy beam creates a higher level of discharge of photoconductor 14. Hereafter, the discharge caused by the low output energy beam will be referred to as the first discharge voltage, and the discharge caused by the high output energy beam will be referred to as the second discharge voltage.

As will be understood by those skilled in the art, the first discharge voltage is of a larger magnitude with respect to a neutral potential than is the second discharge voltage.

A developer enclosure 24 includes toner receptacles 26 and 28 that are, respectively, associated with developer rollers 30 and 32. A doctor blade 36 bears against the outer surface of developer roller 30 and, in similar fashion, a doctor blade 38 bears against the outer surface of developer roller 32.

A transfer roller 40 bears against photoconductor surface 14 and enables toned images thereon to be transferred to a media sheet 42 as the media sheet passes between transfer roller 40 and photoconductor 14.

The invention employs plural toners, all having an intrinsic charge state of the same sense. In particular, receptacle 26 includes a toner "A" that exhibits a high level of intrinsic charge, whereas toner receptacle 28 includes toner "B" that exhibits a lower level of intrinsic charge.

As described above, laser system 18 exhibits at least two output energy levels. A low energy level beam from laser system 18 causes the initial charge state on photoconductor 14 to be discharged to an intermediate first discharge level, i.e., level 50 shown in FIGS. 2a and 2b. By contrast, a high energy output beam from laser system 18 causes a much deeper discharge of photoconductor 14 to the second discharge level 52. Accordingly, when it is desired to develop an image pixel using only toner "A", laser system 18 is controlled to output a high energy beam 20 which results in second discharge voltage level 52 on photoconductor 14.

When that voltage state is seen at developer roller 30, in combination with the high intrinsic charge of toner "A", the coulombic attraction is sufficient to cause toner A particles to migrate to the surface of photoconductor 14. When that same pixel position thereafter passes developer roller 32, second discharge voltage level 52 is insufficient in magnitude to attract the toner B particles (with a lower intrinsic charge) to photoconductor 14.

If it is desired to develop a pixel using both toner A and toner B particles, laser system 18 is controlled to output a low energy beam 20 that causes a small discharge of the charge state on photoconductor 14 (e.g., to level 50 shown in FIGS. 2a, 2b). In this case, when a photoconductor pixel area evidencing a charge voltage at level 50 passes developer roller 30, toner A is attracted thereto by the high potential difference. When that same pixel position then rotates past developer roller 32, toner B is caused to deposit on photoconductor 14 by virtue of the high charge voltage thereon. Accordingly, a double layer of toner results.

The above described system (and laser output energy levels), can be used to develop a multiple level gray dot through either of two methods. A first method employs doctor blade 36 to reduce the amount of toner A that is transferred onto developer roller 30 and, subsequently, to photoconductor 14. Thus, when photoconductor 14 exhibits the first charge voltage level 52, a reduced amount of toner A is developed at the discharged pixel sites. Doctor blade 36 causes a sparse dispersion of toner A onto developer roller 30 such that the toner A, when developed onto the photoconductor 14 exhibits a non-continuous toned surface. Due to the dispersion of Toner A on developer roller 30, a "gray" dot is formed.

When it is desired to develop a solid black dot, photoconductor 14 is caused to discharge to second charge voltage level 50, thereby enabling both toner A and toner B to be developed on photoconductor 14.

A second method embodying the invention employs two colors of toner. Toner A exhibits a gray level approximately mid-way between white and black. Toner B is dark black in color. Thus, when only toner A is developed (i.e., charge voltage level 52 on photoconductor 14), a gray toner dot results. When, however, photoconductor surface 14 exhibits charge voltage level 50, toner B is developed over toner A, causing the developed dot to be black. For both methods, gray dots can be used in combination with the black dots to form gray scale images.

Referring to FIGS. 3a and 3b, the first method is shown wherein toner A is developed to form a gray dot (it being remembered that doctor blade 36 causes a sparse dispersion of toner A about developer roller 30). As shown in FIG. 3b, when toner A and toner B are developed, using the first method, a black dot is formed.

As shown in FIGS. 4a and 4b, a gray dot is formed by toner A when it, alone, is developed onto photoconductor 14. However, when toner B is emplaced thereover, a black dot results.

The method of the invention can be expanded to include more than two levels of gray by having several discharge levels imparted to photoconductor 14. It can also be expanded to include various color toners that are provided with different intrinsic charge states, albeit of the same sense.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. An electrophotographic imaging system for producing gray level images, comprising:

a charger for repetitively charging a photoconductor to a first charge potential;

a laser system for selectively discharging said photoconductor in accordance with applied image signals, said laser system adapted to discharge said photoconductor to at least a first high charge voltage and a second low charge voltage;

a first toner supply for providing a first toner to said photoconductor, said first toner supply including a development roller and means for dispersing said first toner onto said development roller in a sparse fashion such that said first toner, when developed onto said photoconductor exhibits a non-continuous toned surface, said first toner exhibiting an intrinsic charge state that is attracted to said photoconductor by said second low charge voltage;

a second toner supply for providing a second toner to said photoconductor, said second toner exhibiting a higher intrinsic charge state and of a same sense as the intrinsic charge state of said first toner, said second toner attracted to said photoconductor by either said first high charge voltage or said second low charge voltage; and control means for modulating said laser system in accordance with applied data (i) to cause said photoconductor to exhibit said first high charge voltage when both said first toner and second toner are to be developed and (ii) to cause said photoconductor to exhibit said second low charge voltage when only said first toner is to be developed.

2. The electrophotographic imaging system as recited in claim 1, wherein said first toner exhibits a first color and said second toner exhibits a second color.

3. The electrophotographic imaging system as recited in claim 2, wherein said first toner exhibits a gray color and said second toner exhibits a black color.

4. The electrophotographic imaging system as recited in claim 1, wherein said first toner and second toner exhibit a same color.

5. The electrophotographic imaging system as recited in claim 1, wherein said means for dispersing said first toner comprises a blade adapted to bear against an outer surface of said developer roller.

6. An electrophotographic imaging method for producing gray level images, said method comprising the steps of:

a) repetitively charging a photoconductor to a first charge potential;

b) selectively discharging said photoconductor in accordance with applied image signals to at least a first high charge voltage and a second low charge voltage, both said charge voltages being different that said first charge potential;

c) providing a first toner exhibiting an intrinsic charge state that is attracted to said photoconductor by said second low charge voltage and a second toner exhibiting a higher intrinsic charge state and of a same sense as the intrinsic charge state of said first toner, said second toner attracted to said photoconductor by either said first high charge voltage or said second low charge voltage;

d) causing said photoconductor to (i) exhibit said first high charge voltage when both said first toner and second toner are to be developed and (ii) to exhibit said second low charge voltage when only said first toner is to be developed; and e) Dispersing said first toner onto a developer roller in a sparse fashion such that said first toner, when developed onto said photoconductor, exhibits a non-continuous toned surface.

7. The electrophotographic imaging method as recited in claim 6, wherein step b) is accomplished by modulating a laser beam to at least two energy levels.

8. The electrophotographic imaging method as recited in claim 6, wherein said first toner exhibits a first color and said second toner exhibits a second color.

9. The electrophotographic imaging method as recited in claim 8, wherein said first toner exhibits a gray color and said second toner exhibits a black color.

10. The electrophotographic imaging method as recited in claim 6, wherein said first toner and second toner exhibit a same color.

* * * * *